United States Patent [19]
Roustaei

[11] Patent Number: 5,627,358
[45] Date of Patent: May 6, 1997

[54] SYSTEM AND METHOD FOR READING TWO-DIMENSIONAL BARCODES

[76] Inventor: Alexander Roustaei, 2454 Rue Denise, La Jolla, Calif. 92037

[21] Appl. No.: 262,152

[22] Filed: Jun. 20, 1994

[51] Int. Cl.$^6$ .................................................. G06K 7/10
[52] U.S. Cl. ............................................................. 235/462
[58] Field of Search .............................. 235/462, 494, 235/463, 454, 455, 472; 348/426, 506, 513; 375/1

[56] References Cited

U.S. PATENT DOCUMENTS

| | | | |
|---|---|---|---|
| 4,567,361 | 1/1986 | Rosenthal | 235/462 |
| 4,728,784 | 3/1988 | Stewart | 235/462 |
| 5,157,687 | 10/1992 | Tymes | 235/462 |
| 5,243,655 | 9/1993 | Wang | 235/462 |
| 5,291,009 | 3/1994 | Roustaei | 235/462 |
| 5,319,181 | 6/1994 | Shellhammer et al. | 235/462 |
| 5,349,172 | 9/1994 | Roustaei | 235/462 |
| 5,354,977 | 10/1994 | Roustaei | 235/462 |
| 5,378,881 | 1/1995 | Adachi | 235/462 |

*Primary Examiner*—Donald T. Hajec
*Assistant Examiner*—Thien Minh Le
*Attorney, Agent, or Firm*—Brown, Martin, Haller & McClain

[57] ABSTRACT

A system and method for reading a two-dimensional barcode symbology. The two-dimensional barcode symbology has lines of data, each of the lines having several bars and spaces, each of the bars and spaces having a width. The method comprises scanning one of the lines using a CCD optical scanning head to obtain a scanned line. The bars and spaces in the scanned line are then converted into element time intervals, each of the element time intervals corresponding to, and representing the width of, one of the bars and spaces, thereby obtaining a converted line. For the converted line, a predefined prefix message, followed by the element time intervals, followed by a predefined suffix message are then output from the CCD optical scanning head to a processor.

15 Claims, 3 Drawing Sheets

SYSTEM AND METHOD FOR READING TWO-DIMENSIONAL BARCODES

BACKGROUND OF THE INVENTION

1. Field of the Invention

The present invention relates to a system and method for reading two-dimensional barcode symbologies. More particularly, the present invention relates to a system and method for reading a two-dimensional barcode using a CCD optical scanning head.

2. Description of Related Art

Barcode symbology provides an efficient and beneficial method by which to store and convey data. Thus, many industries have adopted the barcode format to facilitate processing of all kinds of information.

Conventional barcodes are presented in a "one-dimensional" format. In one-dimensional barcodes, a series of bars and spaces having varying widths are provided in a single horizontal line. Each bar and space in the line represents a piece of the information carried in the one-dimensional barcode. Taken together, the bars and spaces represent the totality of the message to be conveyed by the barcode. The actual information contained in each bar and space depends on its width.

One-dimensional barcodes are limited, however, in the amount of information they can store and convey. Because such a barcode contains all its bars and spaces in a single line, to handle more than a small amount of information, the barcode must be made longer and/or the bars and spaces narrower. Substantial lengthening of a one-dimensional barcode, however, is impractical, and the bars and spaces cannot be made too narrow, because barcode scanners would be unable to read them.

Accordingly, a new barcode architecture has been developed, known as "two-dimensional" barcode symbology. Two-dimensional barcodes contain more than one line of bars and spaces, the lines being stacked to create a rectangular symbol. In other words, a two-dimensional barcode has horizontal and vertical components. With lines of bars and spaces stacked in two-dimensional format, substantially more information can be stored in a single two-dimensional barcode than in one-dimensional barcodes.

Nevertheless, with the added complexity of stacking lines of bars and spaces on top of each other, two-dimensional barcodes have created new problems in scanning and reading technology. While scanning heads do exist that can operate to read two-dimensional barcodes, no system or method has been developed that can operate accurately and efficiently, but at the same time without the necessity of expensive equipment, such as laser scanning heads. Such a system would incorporate CCD scanning heads, which are less costly than laser scanning heads, and yet can accurately read two-dimensional barcodes.

Therefore, a need exists for a system and method for reading two-dimensional barcode symbologies that is accurate, efficient, and inexpensive, in particular that incorporates a CCD optical scanning head.

SUMMARY OF THE INVENTION

Accordingly, the present invention is directed to a system and method for reading two-dimensional barcode symbology using a CCD optical scanning head that substantially obviates one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof, as well as the appended drawings.

To achieve these and other advantages, and in accordance with the purpose of the present invention, as embodied and broadly described herein, the invention is a method for reading a two-dimensional barcode symbology. The two-dimensional barcode symbology has lines, each of the lines having bars and spaces, each of the bars and spaces having a width. The method comprises scanning one of the lines using a CCD optical scanning head to obtain a scanned line. The bars and)spaces from the scanned line are converted into element time intervals, each of the element time intervals corresponding to, and representing the width of, one of the bars and spaces. Converting the scanned line obtains a converted line. For the converted line, a predefined prefix message, followed by the element time intervals, followed by a predefined suffix message are all output from the CCD optical scanning head to a processor.

In another aspect, the present invention is a system for reading a two-dimensional barcode symbology. The two-dimensional barcode symbology has lines, each of which has bars and spaces, each of the bars and spaces having a width. The system comprises a CCD optical scanning head for scanning one of the lines to obtain a scanned line. The system also comprises a processor for converting the bars and spaces in the scanned line into element time intervals, each of the clement time intervals corresponding to, and representing the width of, one of the bars and spaces. The process of converting the scanned line results in a converted line. The system finally comprises a data port for sending from the CCD optical scanning head to a second processor, for the converted line, a complete line of data. The complete line of data comprises a predefined prefix message, followed by the element time intervals, followed by a predefined suffix message.

BRIEF DESCRIPTION OF THE DRAWINGS

Understanding of the present invention will be facilitated by consideration of the following detailed description of a preferred embodiment of the present invention taken in conjunction with the accompanying drawings, in which like numerals refer to like parts, and in which.

DESCRIPTION OF THE PREFERRED EMBODIMENT

Figure 1:
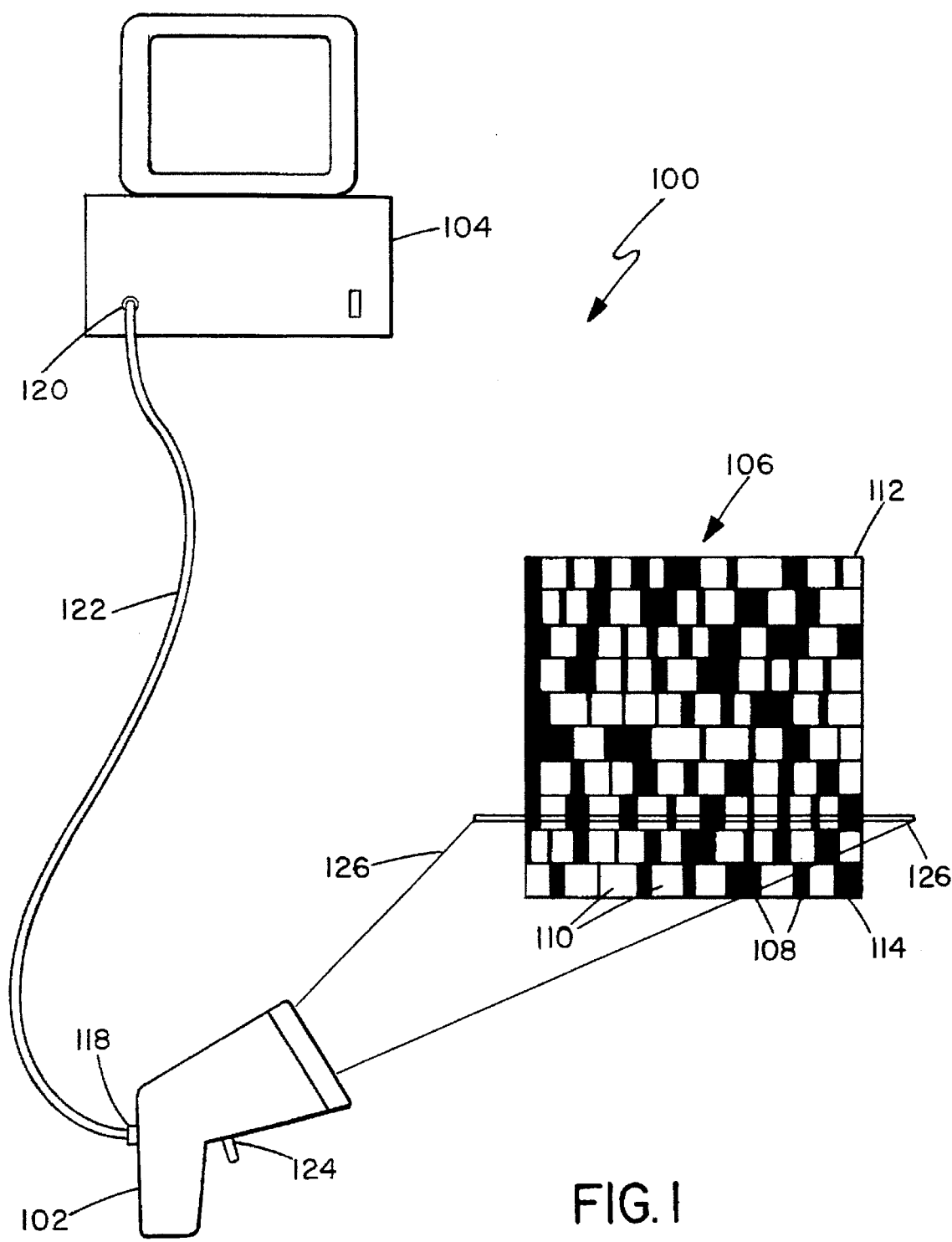
FIG. 1 is a diagrammatical representation of the system of the present invention.

An exemplary embodiment of the system of the present invention is illustrated in FIG. 1 and is designated generally by reference numeral 100.

As embodied and shown in FIG. 1, the present invention includes a CCD optical scanning head 102 and a host processor 104, both of which are used in reading a two-dimensional barcode symbol 106. As can be seen in FIG. 1, the barcode symbol 106 has a number of linear (or one-dimensional) barcode symbols stacked on one another. The symbol 106, therefore, is a two-dimensional barcode symbol.

Each line in the barcode 106 has several bars 108 and spaces 110. Each of the bars and spaces have a width. As described above, the particular width of each bar and space indicates the particular information contained in the bar or space. The host processor 104 may be a conventional personal computer or workstation, as is widely available and well known in the art. Alternatively, the processor 104 need not be a host, but rather may be part of and internal to the scanning head 102.

Examples of the CCD optical scanning head 102 that can be used in the present invention are disclosed in U.S. Pat. Nos. 5,291,009 and 5,349,172, as well as co-pending application Ser. No 08/059,322, filed May 7, 1993, invented by the inventor and assigned to the assignee of the present invention. The entirety of the disclosure of the above patents and co-pending application U.S. Pat. Nos. 5,291,009 and 5,349,172 is incorporated herein by reference. The CCD optical scanning head 102 may have a linear CCD array, for example, 2048 pixels of 14×200 microns.

The CCD optical scanning head 102 can be configured to read the barcode 106 and to transmit the undecoded bar and space width information that is measured from a scan of the barcode imaged by the linear CCD array. This information can be used by the host processor 104 for a variety of functions, including special non-standard decoding algorithms and analysis of barcode label printing characteristics. In accordance with the present invention, the host processor 104 can also be used to decode a two-dimensional symbology if either a beam 126 emanating from the CCD optical scanning head 102 is moved across the barcode symbol 106 from top 112 to bottom 114, or if the symbol is shifted through the beam 126 of the scanning head 102 from top 112 to bottom 114, or vice-versa, i.e., from the bottom 114 to top 112. The CCD optical scanning head 102 presents the read, but undecoded, data from the barcode symbol 106 to the host processor 104 in a convenient format. Alternatively, as described below, the scanning head 102 can decode the read data and transmit the decoded data to the processor 104.

The beam 126 of the scanning head 102 is moved up or down along the barcode 106 (or alternatively the barcode 106 is moved up or down beneath the head 102), scanning the barcode 106 many times. Preferably, the scanning head 102 is set such that it performs 28 scans per second. Accordingly, every 1/28 of a second the scanning head 102 scans the symbol 106. In this way, so long as the beam 126 the scanning head 102 is not moved too quickly up or down the symbol 106 (or vice-versa), the scanning head 102 will scan each line of the symbol 106 at least once. If, however, the velocity of the scanning head 102 or the symbol 106 is too great, scanning will be unsuccessful, because each line in the symbol 106 will not be scanned at least once. As those skilled in the art will recognize, this maximum velocity is dependent on the height of each line in the symbol 106 and the number of scans per second performed by the scanning head 102.

After each scan is complete (i.e., after each line is scanned and converted), a message is transmitted from an output port 118 in the scanning head 102 to an input port 120 in the host processor 104 through a connector cable 122. Alternatively, the scanning head 102 and the host processor 104 need not be hard-wired together, instead communicating in a wireless system. The transmitted message contains an encoded representation of the CCD array of bar and space widths that are measured during the scan. These widths are referred to as element time intervals (or "ETIs"). The ETIs are encoded as bytes in the ETI message in the same way that bytes of data are encoded for a status message, as is well-known to those skilled in the art.

Figure 2:
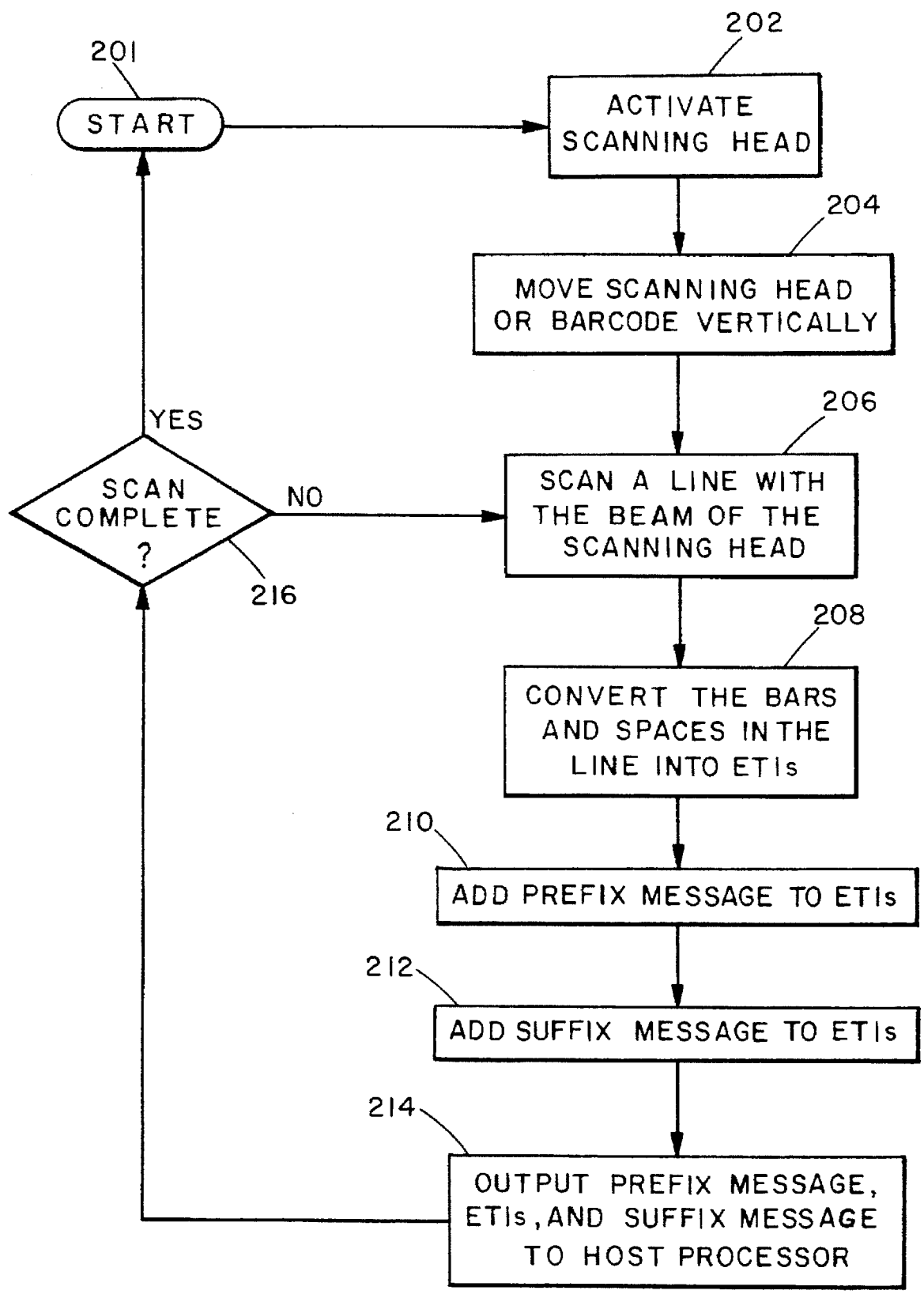
FIG. 2 is a flow diagram illustrating a method in accordance with the present invention for reading a two-dimensional barcode symbol.

An exemplary method for scanning, encoding (or converting), and outputting encoded information contained in the barcode symbol 106 using the system of the present invention will now be described with reference to FIG. 2. The process begins in the start state (Step 201), in which the system is inactive, awaiting activation to commence the barcode reading process. Then in Step 202, the scanning head 102 is activated by a user, for example, by pressing a button or trigger 124 on the scanning head. Alternatively, the scanning head can be activated by the processor 104. The process then goes to Step 204, in which the user commences moving the beam 126 of the scanning head across the barcode symbol 106 in a vertical direction, or moves the symbol in a vertical direction beneath the scanning head. Because the scanning head 102 has been activated, preferably scanning the symbol 28 times per second, the scanning head beam will scan a line of bars and spaces in the barcoded symbol, as in Step 206.

Once a line in the symbol 106 is scanned, the scanned information is processed to obtain a series of ETIs corresponding to the bars and spaces in the second line, as in Step 208. The process of converting scanned bars and spaces into ETIs is well known in the art. In the ETI conversion process the scanning head 102 is timed by an internal clock, which operates in cycles. For each bar and space in a line, the time it takes to scan the bar or space is measured by the clock, and the number of cycles of the clock it takes to scan the bar or symbol corresponds to the width of the bar or space. For example, if it takes 80 cycles of the clock for a particular bar to be scanned, then the width of that bar will be recorded as "80" (hereinafter referred to as a "cycle value"). Preferably, each width comprises a two digit cycle value, e.g., 80 or 56 (a bar or space requiring 80 cycles to be scanned being wider than a bar or space requiring 56 cycles).

Each digit in the two digit cycle value is encoded as two ASCII characters in a byte of data. Accordingly, two bytes (or four nibbles) are required for each cycle value. In other words, the width of each of the bars and spaces is encoded as a sixteen-bit word, each of the four-bit nibbles corresponding to an ASCII character. To complete encoding of the widths of the bars and spaces, 30 hex is added to each nibble in the cycle value, the resulting ASCII characters being in the "0" to "?" range. Thus, the bars and spaces in the scanned line are converted into ETIs, creating a converted line.

In Step 210, a predetermined prefix message is added before the ETIs contained in the converted line. Preferably, the predetermined prefix message comprises a predefined Prefix String and three ASCII encoded characters, specifically "ESC", "\", and "{". In addition, in Step 212, a predetermined suffix message is added after the ETIs contained in the converted line. The suffix message preferably comprises an ASCII encoded "}" followed by a predefined Suffix String. As those skilled in the art will recognize, other prefix and/or suffix messages can be used with similar effect, i.e., to frame the ETIs.

In Step 214, the scanned and encoded line, including the prefix message, ETIs, and suffix message, are output to the host processor 104. (As stated above, alternatively the processor 104 is built-in to the scanning head 102.) Then, the system determines, in Step 214, whether scanning of the barcode symbol 106 is complete. If not, the process, beginning with Step 206, i.e., scanning a line, is preferably repeated through Step 214 until each line in the barcode symbol 106 has been scanned, converted, and output, as described above. The result of this process is complete reading of a two-dimensional barcode symbol. When the entire symbol has been read, the scan is complete, and Step 214 exits in the Yes branch, causing the system to return to the Start (or inactive) state of Step 201.

Figure 3:
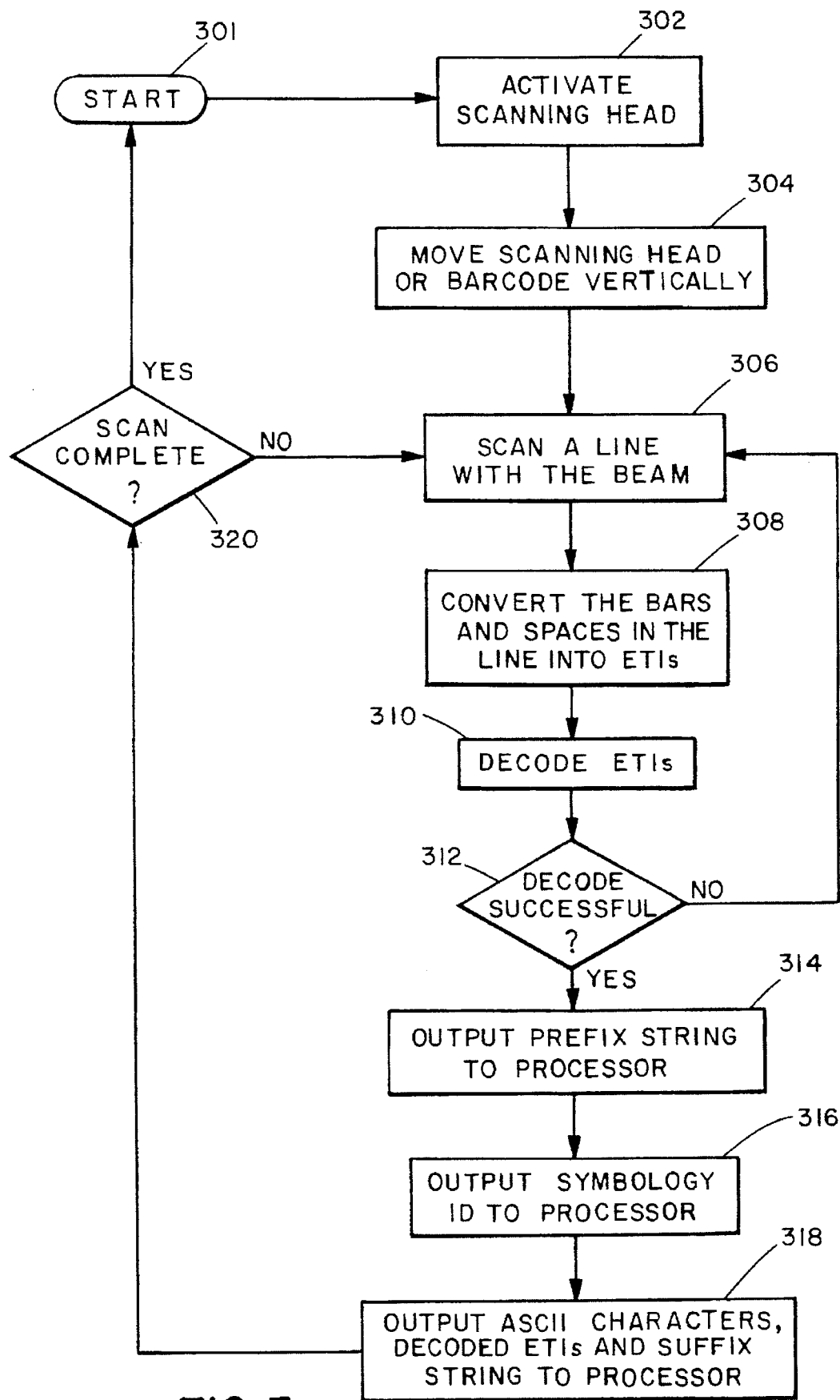
FIG. 3 is a flow diagram illustrating another method in accordance with the present invention for reading a two-dimensional barcode symbol.

Referring now to FIG. 3, the method of reading a two-dimensional barcode symbol can include additional steps in order to detect improperly scanned lines and to output decoded data. It is possible that the scanning head 106 will not successfully scan a single line; it may, instead, scan part of one line and part of another, resulting in unusable information. A line may in other ways be scanned unsuccessfully. For example, the barcode symbol 106 may be skewed from the scan direction at such an angle that the linear beam 126 of the CCD array will cross two or more separate lines of the symbol. The point is, nevertheless, that improper scanning of a line of data in a barcode symbol may result in erroneous data being output to the processor 104 and ultimately erroneous data being processed by the processor.

Accordingly, the system may be set up such that it can distinguish a scan of a single line from an improper scan. The flow diagram illustrated in FIG. 3 includes several of the same steps illustrated in and described with respect to FIG. 2. These duplicative steps (namely, Steps 301, 302, 304, 306, and 308), therefore, will not be described in detail with respect to FIG. 3.

As illustrated in FIG. 3, the system is activated (Step 302) from the Start State (Step 301), and the beam 126 of the scanning head 102 or barcode symbol 106 is moved in a vertical direction (Step 304). The scanning head beam scans a line (Step 306), and the bars and spaces in the scanned line are converted into ETIs (Step 308). At this point, additional steps are performed. First, the processor 104 of the scanning head 102 can be used to decode" the ETIs (Step 310) and then determine whether a successful or unsuccessful decode has occurred (Step 312). The process of determining whether a decode is successful or unsuccessful is well known in the art. If, as shown in Step 312, the decode is unsuccessful, Steps 306 through 312 are repeated. That is, the symbol is again scanned (Step 306), the bars and spaces in the newly scanned line are converted into ETIs (Step 308), those ETIs are decoded (Step 310), and the decoded information is again examined to determine whether the decode was successful or unsuccessful (Step 312).

If, on the other hand, the decode was successful, further processing occurs. First, the predefined Prefix String is output to the processor 104 (Step 314), preferably the same Prefix String as used in the process illustrated in FIG. 2. After the Prefix String is output, a Symbology ID may be output (Step 316), if such an ID is enabled, i.e., if desired. Following the Symbology ID, ASCII encoded characters "ESC", "\", and "{", followed by the decoded ETIs, followed by a terminating ASCII "}", followed by the Suffix String, are all output to the processor 104 (Step 318) preferably in that order. If all the lines have been scanned, the system is returned (through Step 320) to the Start State (Step 301), but if scanning is not complete the system is returned (also through Step 320) to the scanning action of Step 306.

The processor 104 may control the two-dimensional barcode reading process. The processor may include circuitry to control the process, but preferably is equipped with software for process control and data manipulation. Those with skill in the art will understand that a host computer (such as the processor 104) can be programmed to control the described processes, or that a processor internal to the scanning head 102 act as the controller. If an external host processor such as a PC is used, the data output from the CCD scanning head 102 is received through an RS 232 or in the host processor 104. In addition to two-dimensional symbologies, the system of the present invention is also capable of reading one-dimensional symbologies.

It will be apparent to those skilled in the art that various modifications and variations can be made in the apparatus and method of the present invention without departing form the spirit or scope of the invention. Thus, it is intended that the present invention cover the modifications and variations of this invention, provided they come within the scope of the appended claims and their equivalents.

What is claimed is:

1. A method for reading a two-dimensional barcode symbology, said two-dimensional barcode symbology having a plurality of lines, each of said lines having a plurality of bars and spaces, each of said plurality of bars and spaces having a width, said method comprising scanning one of said plurality of lines of said two-dimensional barcode symbology using a CCD optical scanning head to obtain a scanned line;

converting said plurality of bars and spaces in said scanned line into a plurality of element time intervals, each of said plurality of element time intervals corresponding to, and representing said width of, one of said plurality of bars and spaces, thereby obtaining a converted line; and outputting from said CCD optical scanning head to a processor, for said converted line, a prefix message, followed by said plurality of element time intervals, followed by a suffix message, wherein the prefix message comprises a prefix string followed by at least three characters encoded in an ASCII format.

2. The method recited in claim 1, further comprising repeating the scanning step, the converting step, and the outputting step for all of the plurality of lines.

3. The method recited in claim 1 wherein the suffix message comprises at least one character encoded in an ASCII format followed by a suffix string.

4. The method recited in claim 1 wherein each of the plurality of element time intervals comprises a 16-bit data string.

5. The method recited in claim 4 wherein the 16-bit data string comprises four four-bit characters encoded in an ASCII format.

6. A method for reading a two-dimensional barcode symbology, said two-dimensional barcode symbology having a plurality of lines, each of said lines having a plurality of bars and spaces, each of said plurality of bars and spaces, each of said plurality of bars and spaces having a width, said method comprising:

scanning one of said plurality of lines of said two-dimensional barcode symbology using a CCD optical scanning head to obtain a scanned line;

receiving said scanned line in a first processor;

in said first processor, converting said plurality of bars and spaces in said scanned line into a plurality of element time intervals, each of said plurality of element time intervals corresponding to, and representing said width of, one of said plurality of bars and spaces, thereby obtaining a converted line;

receiving said converted line in a second processor;

in said second processor, decoding said converted line to obtain a decoded line;

determining whether a successful decode or an unsuccessful decode of said decoded line has occurred;

if said successful decode has occurred, outputting from the CCD scanning head to said second processor, for said decoded line, a prefix message, followed by said decoded line, following by a suffix message; and if said unsuccessful decode has occurred, repeating the scanning step, the converting step, the decoding step, and the determining step.

7. The method recited in claim 6 wherein the prefix message comprises a prefix string followed by at least three characters encoded in an ASCII format;

wherein the suffix message comprises at least one character encoded in said ASCII format followed by a suffix string;

and wherein each of the plurality of element time intervals comprises a 16-bit data string, said 16-bit data string comprising four four-bit characters encoded in said ASCII format.

8. A system for reading a two-dimensional barcode symbology, said two-dimensional barcode symbology having a plurality of lines, each of said lines having a plurality of bars and spaces, each of said plurality of bars and spaces having a width, said system comprising a CCD optical scanning head for scanning one of said plurality of lines of said two-dimensional barcode symbology to obtain a scanned line;

a first processor for converting said plurality of bars and spaces in said scanned line into a plurality of element time intervals, each of said plurality of element time intervals corresponding to, and representing said width of, one of said plurality of bars and spaces, thereby obtaining a converted line;

a data port for sending from said CCD optical scanning head to a second processor, for said converted line, a complete line of data, said complete line of data comprising a prefix message, followed by said plurality of element time intervals, followed by a suffix message; and the second processor for decoding said complete line of data and determining whether a successful scan or an unsuccessful scan of said two-dimensional bar code has occurred, for outputting said complete line of data if the successful scan has occurred, and for generating a repeat scan command to said CCD optical scanning head if the unsuccessful scan occurred.

9. The system recited in claim 8, wherein said second processor further generates a command for repeating the scanning step, the converting step, and the outputting step for all of the plurality of lines when the successful scan has occurred.

10. The system recited in claim 8, wherein the prefix message comprises a prefix string followed by at least three characters encoded in an ASCII format.

11. The system recited in claim 8, wherein the suffix message comprises at least one character encoded in an ASCII format followed by a suffix string.

12. The system recited in claim 8, wherein each of the plurality of element time intervals comprises a 16-bit data string.

13. The system recited in claim 12 wherein the 16-bit data string comprises four four-bit characters encoded in an ASCII format.

14. A system for reading a two-dimensional barcode symbology, said two-dimensional barcode symbology having a plurality of lines, each of said lines having a plurality of bars and spaces, each of said plurality of bars and spaces having a width, said system comprising:

a CCD optical scanning head for scanning one of said plurality of lines of said two-dimensional barcode symbology to obtain a scanned line;

a processor for converting said plurality of bars and spaces in said scanned line into a plurality of element time intervals, each of said plurality of element time intervals corresponding to, and representing said width of, one of said plurality of bars and spaces, thereby obtaining a converted line;

a second processor for decoding the converted line to obtain a decoded line and for determining whether a successful decode or an unsuccessful decode of said decoded line has occurred;

wherein if said successful decode has occurred, the second processor outputs the complete line of data; and wherein if said unsuccessful decode has occurred, the CCD optical scanning head, the processor, and the second processor are operated to rescan, reconvert, and redecode the decoded line.

15. The system recited in claim 14 wherein the predefined prefix message comprises a prefix string followed by at least three characters encoded in an ASCII format;

wherein the predefined suffix message comprises at least one character encoded in said ASCII format followed by a suffix string;

and wherein each of the plurality of element time intervals comprises a 16-bit data string, said 16-bit data string comprising four four-bit characters encoded in said ASCII format.

* * * * *